US010432284B2

(12) United States Patent
Raghavan et al.

(10) Patent No.: US 10,432,284 B2
(45) Date of Patent: *Oct. 1, 2019

(54) METHODS FOR BEAM SWITCHING IN MILLIMETER WAVE SYSTEMS TO MANAGE THERMAL CONSTRAINTS

(71) Applicant: QUALCOMM Incorporated, San Diego, CA (US)

(72) Inventors: Vasanthan Raghavan, West Windsor Township, NJ (US); Junyi Li, Chester, NJ (US); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,520

(22) Filed: Jan. 8, 2019

(65) Prior Publication Data

US 2019/0140722 A1 May 9, 2019

Related U.S. Application Data

(63) Continuation of application No. 15/910,570, filed on Mar. 2, 2018, now Pat. No. 10,218,422.

(60) Provisional application No. 62/476,237, filed on Mar. 24, 2017.

(51) Int. Cl.
| | | |
|---|---|---|
| *G06F 1/20* | (2006.01) | |
| *H04B 7/06* | (2006.01) | |
| *H04W 72/14* | (2009.01) | |
| *H04W 72/04* | (2009.01) | |
| *H04W 88/02* | (2009.01) | |

(52) U.S. Cl.
CPC ........... *H04B 7/0617* (2013.01); *G06F 1/206* (2013.01); *H04B 7/0639* (2013.01); *H04B 7/0695* (2013.01); *H04W 72/046* (2013.01); *H04W 72/14* (2013.01); *H04W 88/02* (2013.01)

(58) Field of Classification Search
None
See application file for complete search history.

(56) References Cited

U.S. PATENT DOCUMENTS

| 5,565,871 A | * 10/1996 | Aker ...................... G01S 7/003 340/936 |
| 8,494,543 B2 | 7/2013 | Koodli et al. |
| 9,497,116 B2 | 11/2016 | Chakrabarti et al. |
| 2003/0158697 A1 | 8/2003 | Gold et al. |

(Continued)

OTHER PUBLICATIONS

Sung N.W., et al., "Fast Intra-Beam Switching Scheme using Common Contention Channels in Millimeter-wave based Cellular Systems", ICACT Transactions on Advanced Communications Technology (TACT), vol. 5, No. 1, Jan. 2016, pp. 760-765.

*Primary Examiner* — German Viana Di Prisco
(74) *Attorney, Agent, or Firm* — Norton Rose Fulbright LLP

(57) ABSTRACT

Systems and methods herein remedy thermal constraints experienced by wireless communication systems operating in the millimeter wave spectrum. User equipment (UE) having a plurality of antenna subarrays controlled by respective RFICs monitor temperature gradients of respective sectors of the UE. Upon the thermal gradient of a sector reaching a temperature threshold, the UE performs thermal management steps to prevent hardware of a respective sector from damage due to overshoot.

30 Claims, 6 Drawing Sheets

(56) References Cited

U.S. PATENT DOCUMENTS

| | | |
|---|---|---|
| 2007/0106428 A1 | 5/2007 | Omizo et al. |
| 2008/0237358 A1* | 10/2008 | Shibamoto ....... G06K 19/07749 235/492 |
| 2009/0071952 A1* | 3/2009 | Kuwabara ............ H05B 1/0233 219/494 |
| 2009/0299543 A1 | 12/2009 | Cox et al. |
| 2012/0271480 A1 | 10/2012 | Anderson et al. |
| 2016/0095108 A1 | 3/2016 | Ryoo et al. |
| 2017/0098881 A1 | 4/2017 | Barnickel et al. |
| 2017/0149144 A1 | 5/2017 | Gallagher et al. |
| 2017/0188310 A1 | 6/2017 | Kocagoez et al. |
| 2018/0048358 A1 | 2/2018 | Li et al. |
| 2018/0131425 A1 | 5/2018 | Li et al. |
| 2018/0199360 A1 | 7/2018 | Lin et al. |
| 2018/0278309 A1 | 9/2018 | Raghavan et al. |

* cited by examiner

TO FIG. 5 CONTINUED

METHODS FOR BEAM SWITCHING IN MILLIMETER WAVE SYSTEMS TO MANAGE THERMAL CONSTRAINTS

CROSS-REFERENCE TO RELATED APPLICATIONS

This application is a continuation of co-pending, commonly assigned, U.S. patent application Ser. No. 15/910,570, now U.S. Pat. No. 10,218,422, entitled, "METHODS FOR BEAM SWITCHING IN MILLIMETER WAVE SYSTEMS TO MANAGE THERMAL CONSTRAINTS," filed on Mar. 2, 2018, through which benefit of priority is claimed from U.S. Provisional Patent Application No. 62/476,237, entitled, "METHODS FOR BEAM SWITCHING IN MILLIMETER WAVE SYSTEMS TO MANAGE THERMAL CONSTRAINTS," filed on Mar. 24, 2017, the disclosures of which are hereby incorporated by reference herein in their entirety as if fully set forth below and for all applicable purposes.

TECHNICAL FIELD

Aspects of the present disclosure relate generally to wireless communication systems, and more particularly, to selectively switching between antenna subarrays. Certain embodiments of the technology discussed below determine when thermal thresholds are met and selectively switch between antenna subarrays to control thermal conditions.

INTRODUCTION

The use of wireless communication devices has diversified over time, and users expect endlessly increasing services on their User Equipment (UE). UEs are no longer restricted to phone calls and email access. Rather, users are more likely use their devices for live video calls, streaming high definition multimedia, playing real-time interactive games, and more. Wireless communication systems are tasked with uplinking and downlinking significantly more amounts of data in significantly less amounts of time in order to keep up with the new UE applications users demand.

In response, the industry moved toward Long-Term Evolution (LTE) standards to keep up with the increased demand for data. LTE enabled communication systems to increase the amount of data being transmitted through the air yet the frequency spectrum used by LTE has been unable to keep pace with user demands. Bound to a frequency spectrum that is too crowded to support the ever increasing data transmissions, LTE communications have been plagued with high latency issues and a limited amount of space for data transmissions.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method that adjusts beamforming to prevent thermal overshoot of user equipment (UE) hardware is provided. For example, the method can include deciding that a thermal gradient of a sector of the UE breaches a thermal threshold and based at least on the breach of the thermal threshold of the sector, ceasing a servicing antenna subarray from servicing of millimeter wave (mmW) communications at least until the thermal gradient of the sector meets a cool down threshold. In embodiments, the method may include determining whether one or more alternate antenna subarrays are currently operable to support wireless communications during a current beam scanning period and selecting an alternative antenna subarray supports wireless communications during the current beam scanning period. Based on the selection, the method may switch servicing of the mmW communications to the selected alternative antenna subarrays.

In embodiments, the method may send a beam forming matrix switching request, and receive, from a base station, a response granting a request to perform the switching. At least based on the grant, the UE may perform the above mentioned switching according to information indicated in the grant.

In embodiments, the method may send a beam forming matrix switching request, and receive, from a base station, a response denying a request to change a current beamforming matrix. At least based on the response denying the request, the UE may perform the above mentioned selecting based at least on a determination that the alternative antenna subarray supports wireless communications during the current beam scanning period utilizing the current beamforming matrix. Then, the method may switch to the alternative antenna subarray despite the denial.

In examples, the method may conclude that the thermal gradient of the sector meets a cool down threshold, rank the servicing antenna subarray higher than other antenna subarrays of the UE, and based on the concluding and the ranking, restore the servicing antenna subarray servicing of millimeter wave (mmW) communications.

In an additional aspect of the disclosure, an apparatus that adjusts beamforming to prevent thermal overshoot of user equipment (UE) hardware is provided. For example, the apparatus may decide that a thermal gradient of a sector of the UE breaches a thermal threshold and based at least on the breach of the thermal threshold of the sector, cease a servicing antenna subarray from servicing of millimeter wave (mmW) communications at least until the thermal gradient of the sector meets a cool down threshold. In embodiments, the apparatus may determine whether one or more alternate antenna subarrays are currently operable to support wireless communications during a current beam scanning period and select an alternative antenna subarray that supports wireless communications during the current beam scanning period. Based on the selection, the apparatus may switch servicing of the mmW communications to the selected alternative antenna subarrays.

In embodiments, the apparatus may send a beam forming matrix switching request, and receive, from a base station, a response granting a request to perform the switching. At least based on the grant, the UE may perform the above mentioned switching according to information indicated in the grant.

In embodiments, the apparatus may send a beam forming matrix switching request, and receive, from a base station, a response denying a request to change a current beamforming matrix. At least based on the response denying the request, the apparatus may perform the above mentioned selecting based at least on a determination that the alternative antenna subarray supports wireless communications during the current beam scanning period utilizing the current beamforming matrix. Then, the apparatus may switch to the alternative antenna subarray despite the denial.

In examples, the apparatus may conclude that the thermal gradient of the sector meets a cool down threshold, rank the servicing antenna subarray higher than other antenna subarrays of the UE, and based on the concluding and the ranking, restore the servicing antenna subarray servicing of millimeter wave (mmW) communications.

In an additional aspect of the disclosure, a non-transitory computer-readable medium having program code recorded thereon is provided. The program code can include code to decide that a thermal gradient of a sector of the UE breaches a thermal threshold and based at least on the breach of the thermal threshold of the sector, cease a servicing antenna subarray from servicing of millimeter wave (mmW) communications at least until the thermal gradient of the sector meets a cool down threshold. In embodiments, the code may determine whether one or more alternate antenna subarrays are currently operable to support wireless communications during a current beam scanning period and select an alternative antenna subarray that supports wireless communications during the current beam scanning period. Based on the selection, the code may switch servicing of the mmW communications to the selected alternative antenna subarrays.

In embodiments, the code may send a beam forming matrix switching request, and receive, from a base station, a response granting a request to perform the switching. At least based on the grant, the code may perform the above mentioned switching according to information indicated in the grant.

In embodiments, the code may send a beam forming matrix switching request, and receive, from a base station, a response denying a request to change a current beamforming matrix. At least based on the response denying the request, the code may perform the above mentioned selecting based at least on a determination that the alternative antenna subarray supports wireless communications during the current beam scanning period utilizing the current beamforming matrix. Then, the code may switch to the alternative antenna subarray despite the denial.

In examples, the code may conclude that the thermal gradient of the sector meets a cool down threshold, rank the servicing antenna subarray higher than other antenna subarrays of the UE, and based on the concluding and the ranking, restore the servicing antenna subarray servicing of millimeter wave (mmW) communications.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
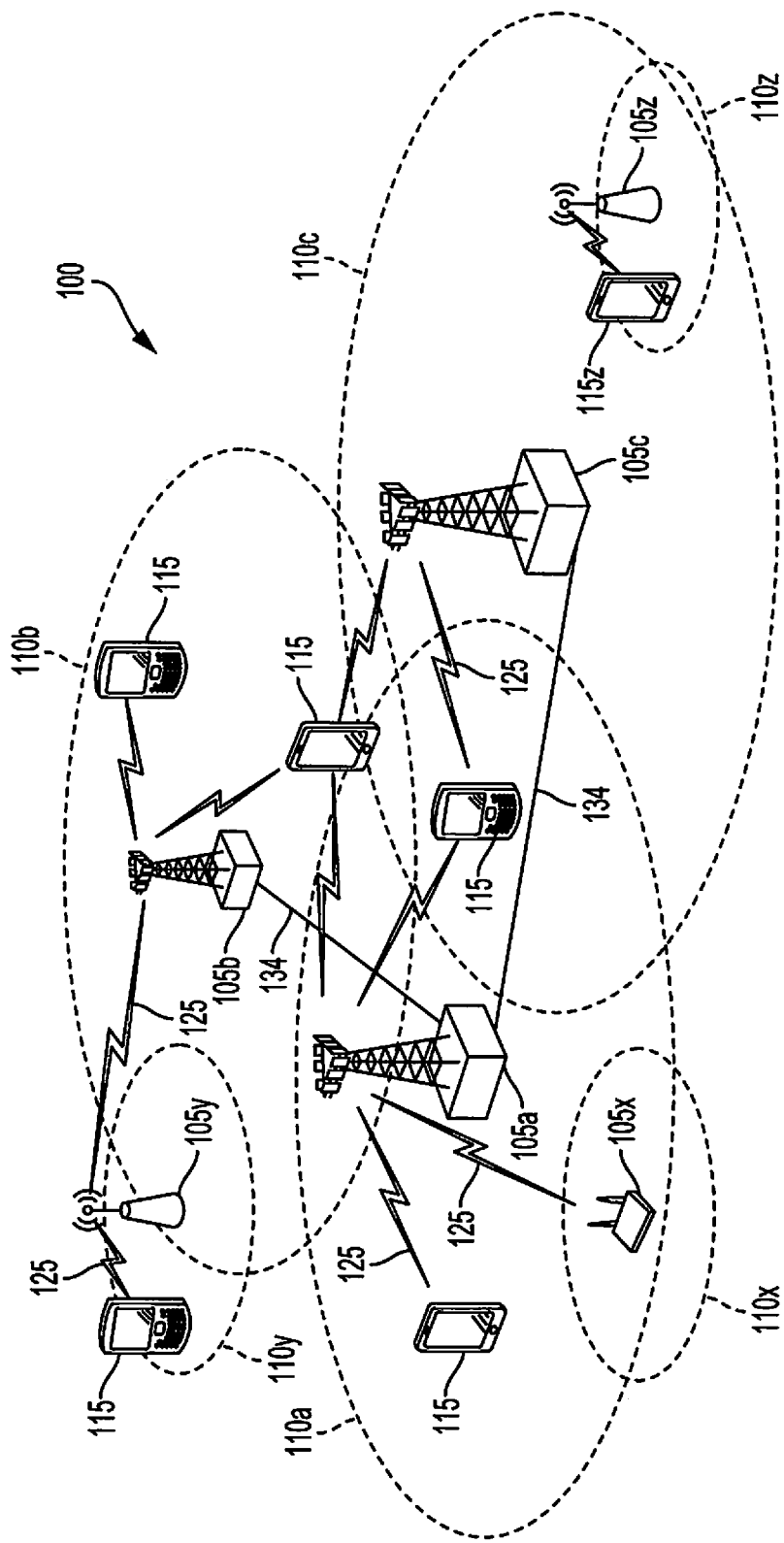
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

User demand for more data is continuing to grow. So, an increase in available spectrum is desired. More spectrum is available in the millimeter frequencies, which occupy the frequency spectrum of 30 GHz to 300 GHz. The millimeter frequencies provide significantly more spectrum as compared to the microwave frequencies, which only occupy up to 30 GHz. In short, millimeter frequencies offer eight times more spectrum real estate. As such, millimeter frequencies offer the available spectrum wireless users are looking for.

Millimeter frequencies, also called the millimeter band, comprises waves of millimeter length, e.g., wavelengths in the 1 mm-10 mm range. A millimeter wave may be abbreviated as mmW. Not only does the millimeter band lend to more spectrum real estate, but mmWs permit higher data digital rates as compared to microwaves. For example, mmWs offer upwards of 10 Gbits per second while microwaves are generally limited to about 1 Gbit per second. The millimeter band provides significantly more frequencies for use in data transmissions and provides higher data rates, which lead to communications having ultra-low latencies.

That being said, mmWs experience harsher propagation conditions as compared to transmission over microwave frequencies. For example, due to the small wavelengths, mmWs have high atmospheric attenuation and are more easily absorbed by gasses in the atmosphere. Millimeter waves' power loss is at least one of the reasons the spectrum has not been previously used for wireless communication. Such power loss leads to poor throughput and previously made the mmW spectrum practically unusable.

Beamforming precision provides a solution to the propagation issues of mmWs. In embodiments, codebooks may be used to zoom in on the most powerful mmW propagation paths/clusters. For example, codebooks may comprise a list of beams that take beam directionality into account. For example, each beam in the codebook may have a directionality difference according to degrees (e.g., 15 degree difference between beams' pointing angles). A UE and its serving base station may share a common codebook. In embodiments, the UE and its base station may scan through the codebook to determine which of the beams provide the best mmW propagation paths at that time. By forming a beam having the directionality that provides one of the top mmW paths at that time, the propagation issues of mmW may be resolved.

That being said, mmW channels lack stability. As such, the mmW path of choice changes more frequently as compared to LTE. A mmW path that is strong at time $t_1$ may suffer serious propagation issues and all together be faded by the atmosphere in a matter of milliseconds. Thus, once a beam is selected from the codebook, the beam may lose its effectiveness quickly.

Increasing the frequency of beamforming, for example via codebook scanning, provides a solution to the channel instability experienced by mmWs. In short, user equipment (UE) is able to overcome mmWs' instability by conducting beam sweeping (a.k.a., beam scanning) more frequently as compared to LTE technology. LTE performs beam scanning about every 320 ms. Embodiments herein increase mmW beam scanning frequency by reducing the period of time between respective scans. For example, beam scanning may be performed as frequently as every 1 ms, 5 ms, 10 ms, 15 ms, 20 ms, and the like. The time period between respective beam scans establish the frequency with which beam scans are conducted (e.g., the beam scanning frequency).

That being said, increased beam scanning leads to hardware processing problems. Beam scanning consumes a significant amount of processing resources, power, and time. As such, increasing beam scanning (e.g. by a factor of 64 or more) causes significant battery power consumption. Such battery consumption leads to shortened device use time and causes user dissatisfaction. Further, the increased processing causes an increase in ambient hardware temperatures. Ambient hardware temperature increases lead to hardware failure and cause further user dissatisfaction.

Further still, UEs frequently include a plurality of antenna controllers. An example of an antenna controller is an RFIC (radio frequency integrated circuit) that supports an antenna subarray. Increasing the number of RFICs and subarrays in an UE allow for unblocked coverage over different areas of the UE that face in different directions. Such a design increases transmission and reception of data even when an object (e.g., a user is holding the UE, a nearby wall, etc.) may interfere with one or more of the subarrays. While increasing the RFICs and subarrays of a UE aids in the directionality of beamforming and overcomes interference obstacles, the increased hardware causes unexpected problems.

Each of the RFICs may benefit from different beamformation, so the UE may perform beam scanning for each individual RFIC in an effort to maximize their respective beamforming capabilities. Performing beam scanning for each RFIC that are within close proximity to each other further exacerbates the hardware processing problems mentioned above. When using mmWs, the frequency of beam scanning may increase (e.g. by a factor of 64 or more) for a single RFIC. If multiple RFICs are within a UE, the frequency of beam scanning increases even more. For example, in an UE having four RFICs, beam scanning may be performed 64 more times as compared to LTE for each of the four RFICs. In this case, the UE is increasing the frequency of its beam scanning by a factor of 256 or more. Such an increase in processing, transmitting, and receiving causes a significant increase in ambient hardware temperatures. Ambient hardware temperature increases lead to hardware failure. Embodiments herein provide solutions to these thermal problems by managing beam switches to manage thermal constraints of the UE's hardware.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces. For example, systems and methods herein may certainly operate on the NG (next generation or NextGen) specifications (a.k.a., 5G).

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements.

Turning back to FIG. 1 wireless network 100 includes a number of base station 105, such as may comprise evolved node Bs (eNBs) and/or NextGen nodes (gNBs). An eNB may be a station that communicates with the UEs and may also be referred to as a base station, a node B, an access point, and the like. Each eNB/gNB 105 may provide communication coverage for a particular geographic area. In 3GPP, the term "cell" can refer to this particular geographic coverage area of an eNB and/or an eNB subsystem serving the coverage area, depending on the context in which the term is used. In implementations of wireless network 100 herein, eNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, eNBs 105a, 105b and 105c are macro eNBs for the macro cells 110a, 110b and 110c, respectively. eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Although backhaul communication 134 is illustrated as wired backhaul communications that may occur between eNBs, it should be appreciated that backhaul communications may additionally or alternatively be provided by wireless communications.

Figure 2:
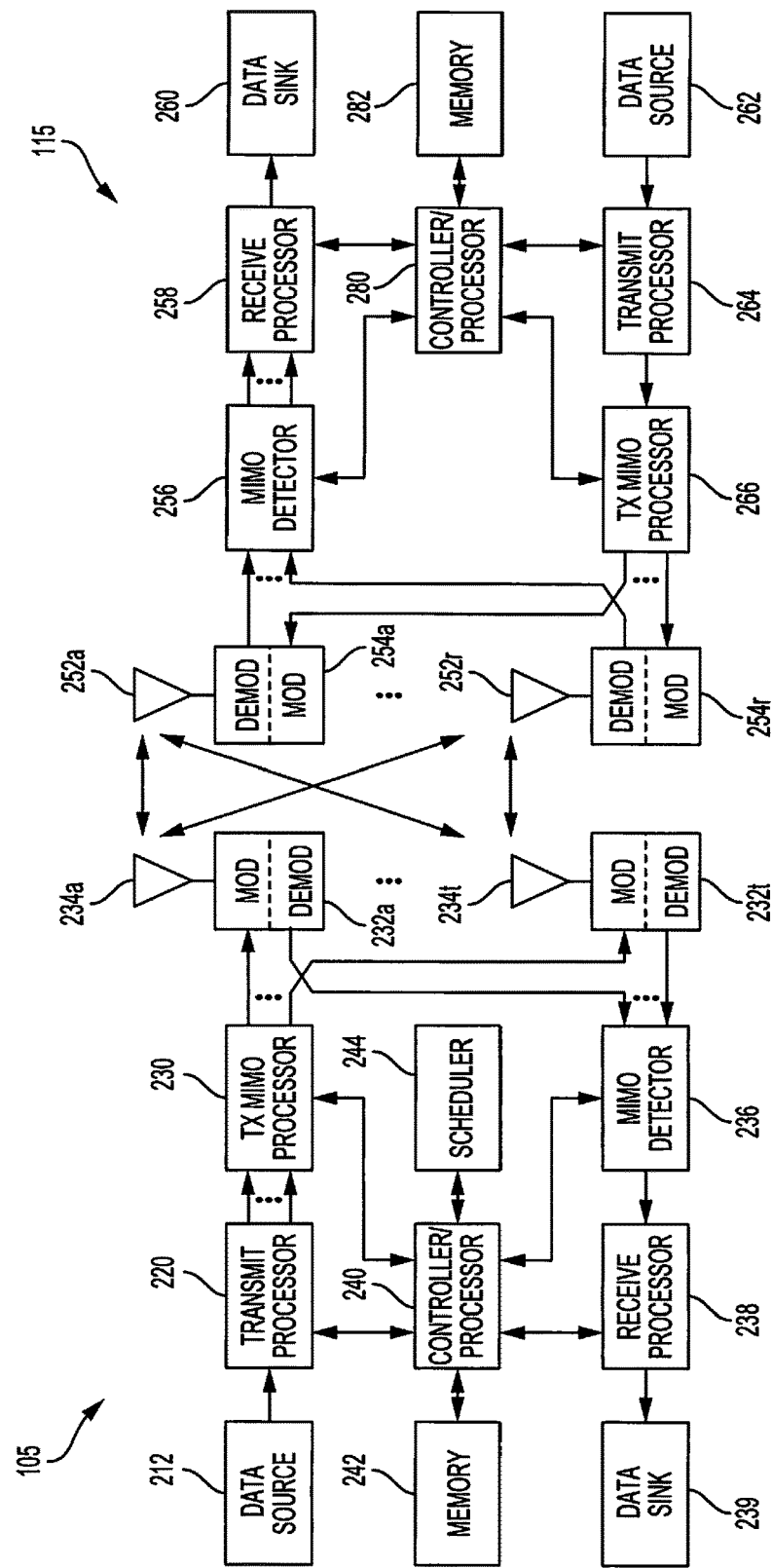
FIG. 2 is a block diagram conceptually illustrating a design of a base station/eNB/gNB and a UE configured according to some embodiments of the present disclosure.

FIG. 2 shows a block diagram of a design of base station/eNB/gNB 105 and UE 115, which may be one of the base stations/eNBs and one of the UEs in FIG. 1. For a restricted association scenario, the eNB/gNB 105 may be small cell eNB/gNB 105z in FIG. 1, and UE 115 may be UE 115z, which in order to access small cell eNB/gNB 105z, would be included in a list of accessible UEs for small cell eNB/gNB 105z. eNB/gNB 105 may also be a base station of some other type. eNB/gNB 105 may be equipped with antennas 234a through 234t, and UE 115 may be equipped with antennas 252a through 252r.

At eNB/gNB 105, transmit processor 220 may receive data from data source 212 and control information from controller/processor 240. The control information may be for the PBCH, PCFICH, PHICH, PDCCH, etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the PSS, SSS, and cell-specific reference signal. Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from eNB/gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to eNB/gNB 105. At eNB/gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at eNB/gNB 105 and UE 115, respectively. Controller/processor 240 and/or other processors and modules at eNB/gNB 105 may perform or direct the execution of various processes for the techniques described herein. Controllers/processor 280 and/or other processors and modules at UE 115 may also perform or direct the execution illustrated in FIGS. 3-5, and/or other processes for the techniques described herein. Memories 242 and 282 may store data and program codes for eNB/gNB 105 and UE 115, respectively. Scheduler 244 may schedule UEs for data transmission on the downlink and/or uplink.

Figure 3:
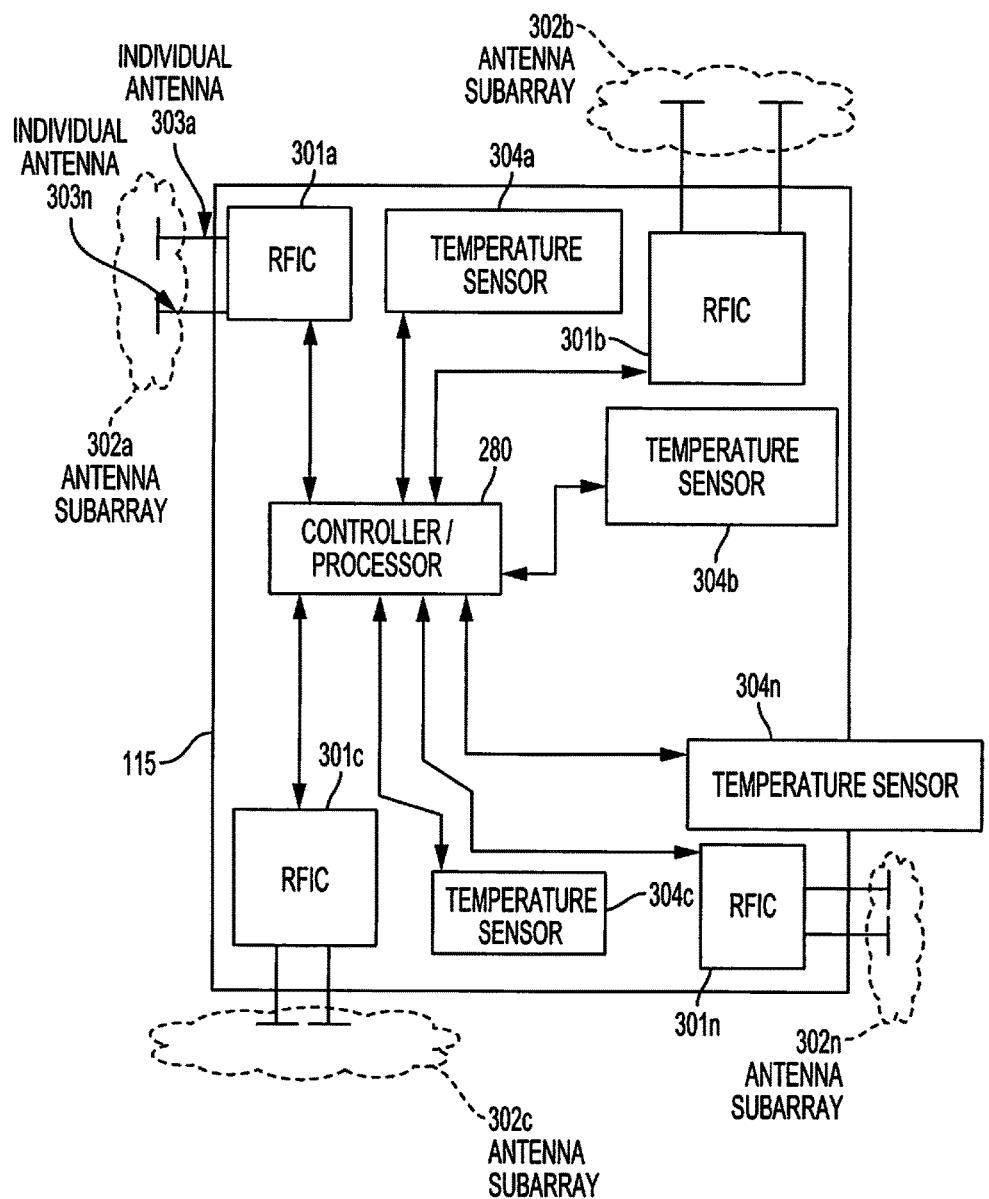
FIG. 3 is a block diagram conceptually illustrating a UE configured according to some embodiments.

FIG. 3 is a block diagram conceptually illustrating a UE configured according to some embodiments. UE 115 comprises one or more antenna subarrays 302a-302n. An antenna subarray 302a may include multiple individual antennas 303a-303n. An antenna subarray 302a may be controlled by an RFIC 301a. UE 115 may include a plurality of radio frequency integrated circuits (RFICs), each of which control a respective antenna subarray. For example, RFID 301a may control antenna subarray 302a; RFID 301b may control antenna subarray 302b; RFID 301c may control antenna subarray 302c; and RFID 301n may control antenna subarray 302n.

One or more of RFIC 301a-301n may be configured to support dual connectivity, wherein the RFIC can send and receive information according to more than one connectivity scheme. For example, RFIC 301a may switch modes in order to support communications according to non-mmW communications, for example but not limited to 3G schemes (e.g., microwaves), LTE schemes (e.g., microwaves), and/or the like. Further, RFIC 301a may switch modes in order to support mmW communications, for example, 5G schemes (e.g, NextGen), and/or the like as is desired at any given time. One or more of RFIC 301a-301n may operate to form beams in differing directions. The ability to form beams in differing directions increases the chances that a beam may be formed in a direction that supports quality communications.

Base station 105 and UE 115 may share one or more common codebook. The codebook may be stored in a memory of UE 115 (e.g., memory 282). The codebook may comprise beam codes which differ at least in directionality. During beam scanning, a processor (e.g., controller/processor 280) may process through the beam codes in the codebook. Based at least on one or more reference signal received power (RSRP) metric, reference signal received quality (RSRQ) metric, and/or reference signal strength indicator (RSSI) metric, the processor may determine current characteristics of the various beams at that time. Having determined the current conditions of the various beams at that time, the processor may determine which of the beams are the top beams (e.g., beams with the highest likelihood of successful communication as compared to the other beams).

Because base station 105 and UE 115 share a common codebook, processors of base station 105 and processors of UE 115 may each perform beam scanning.

Controller/processor 280 of UE 115 may perform independent beam scanning for each respective RFIC. For example, controller/processor 280 may perform beam scanning specifically for RFIC 301a; controller/processor 280 may perform beam scanning specifically for RFIC 301b; controller/processor 280 may perform beam scanning specifically for RFIC 301c; and controller/processor 280 may perform beam scanning specifically for RFIC 301n. In such embodiments, the beam scans for each RFIC may yield different top beam results. Controller/processor 280 may track which top beams correspond with which RFIC. Further, beam scanning may be supported in multiple connectivities. For example, beam scanning may be performed while connected via LTE. Further, beam scanning may be performed while connected via NG/5G.

UE 115 may also comprise one or more sensors. For example, UE 115 may include temperature sensors 304a-304n. Temperature sensors 304a-304n may be located in various places throughout UE 115 as is desired. Temperature sensors 304a-304n may determine temperature gradients of various hardware of UE 115. For example, one or more temperature sensor may determine temperature gradients of one or more RFIC. Controller/processor 280 may use the one or more temperature reading to determine temperature gradients for one or more sectors of UE 115. In embodiments, controller/processor 280 may determine temperature gradients of one or more specific RFIC. In embodiments, controller/processor 280 may control the processing and functionality of one or more RFIC and their respective antenna subarray based at least on temperature gradients.

Figure 4:
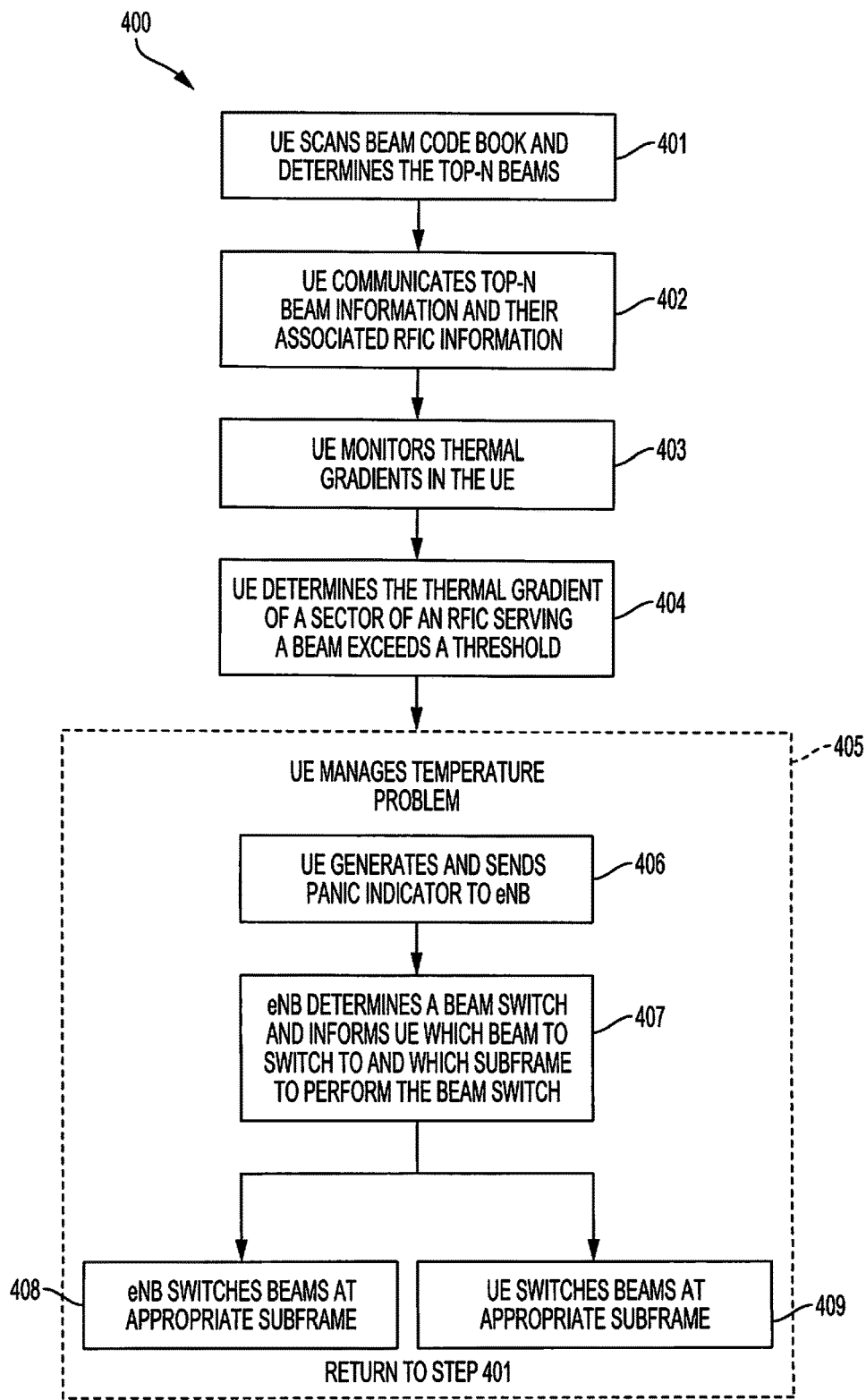
FIG. 4 is an example method of adjusting functionality of one or more hardware components of a device according to some embodiments.

FIG. 4 is an example method of adjusting functionality of one or more hardware components of a device according to some embodiments. Example method 400 may be performed by UE 115 if desired. In step 401, controller/processor 280 scans beam codes within a codebook to determine the top-N beams at that time. A beam may be determined to be a top-N beam based on its likelihood of successful transmission. For example, of the n number of beams scanned, UE 115 may rank the beams using at least RSRP, RSRQ, and/or RSSI metrics. The ranking may indicate the respective beams likelihood of successful communication as compared to each other. UE 115 may select N number of beams of the n number of beams scanned, wherein N is a subset of n. For example, UE 115 may select the top-4 beams of 16 beams scanned.

In embodiments, the beam scanning may be individually performed for each RFIC of the UE 115, thereby yielding different beam results for the various RFICs and their respective antenna subarray. The top-N beams of all the beams scanned may be identified. In embodiments, UE 115 may identify the top-N beams of an individual RFIC and/or the top-N beams of all the RFICs of the device. When identifying the top-N beams, UE 115 may identify a top beam in association with its respective RFID.

In step 402, UE 115 may communicate top-N beam information to base station 105. The top-N beam information may include information with respect to each individual top beam. Top-N beam information may include a channel quality indicator (CQI), precoding matrix indicator (PMI), rank indicator (RI), and/or the like. Top-N beam information may also include an RFIC association to a top beam. For example, information may identify which RFIC corresponds to which top beam. Steps 401 and 402 may be repeated periodically and/or as desired.

In step 403, UE 115 monitors thermal gradients of one or more sectors of UE 115. UE 115 may perform step 403 continually, periodically, in reaction to an event and/or condition, a combination thereof, and/or the like. In step 403, controller/processor 280 may receive temperature readings from one or more temperature sensor 304a-304n.

In step 404, controller/processor 280 may consider the temperature readings independently, jointly, and/or a combination thereof. Based on the temperature readings, processor/controller 280 may determine a thermal gradient for one or more sector of the UE 115. For example, controller/processor 280 may determine a thermal gradient for one or more of RFICs 301a-301n and hardware nearby. Controller/processor 280 may compare the various determined thermal gradients to a thermal threshold. The thermal threshold may be set at a value to prevent thermal overshoot of hardware within a sector. Each sector may have the same or differing thermal thresholds. For example, a sector having RFID 301a may have a different thermal threshold than a sector having RFIC 301b. The thermal threshold may be based on the thermal capacity of the hardware within a defined sector.

In step 405, when controller/processor 280 determines that one or more sector is at a temperature that meets its thermal threshold, then controller/processor 280 manages the thermal overshoot. For example, the orientation and location of UE 115 may lend to RFIC 301a and its antenna subarray having the highest quality beam. And, if the UE is stationary for a period of time, RFIC 301a may continue to have the highest quality beam for a significant period of time. In embodiments, a user may watch a movie on UE 115. For period of time, UE 115 may be relatively stationary. In such an example, RFIC 301a may continue to have the highest quality beam for several seconds, or minutes.

Over time, due to processing, transmitting, receiving, and the like, serving RFIC 301a, serving antenna subarray 303a, and other hardware in the area generate heat. The generated heat begins to raise the ambient temperature in the sector of RFIC 301a. When beamforming is switched away from RFIC 301a, processing, transmission, and receiving slows and the heat generated therefrom reduces thereby allowing the hardware in the area to cool down. If beamforming is not switched away from RFIC 301a for an extended period of time, the sector of RFIC 301a is not afforded the opportunity to cool down. In circumstances wherein RFIC 301a continues to have the top beam of the top-N beams for several consecutive beam scanning periods, the thermal gradient of the sector of RFIC's 301a sector will raise above the thermal threshold. In step 405, if the sector of RFIC 301a is determined to be at a temperature that is higher than the sector's thermal threshold, controller/processor 280 may enter a mode that works to lower the temperature of the sector of RFIC 301a.

Step 405 shows an example method of managing the temperature problem. In step 406, UE 115 informs base station 115 about the temperature problem. For example, UE 115 may send an indicator (e.g. panic mode indicator, temperature indicator, and/or the like) to base station 105. In embodiments, the indicator may be transmitted on via low overhead payload on an mmW control channel (e.g., stand alone mode), on a lower frequency carrier (e.g., non-stand alone mode), and/or the like.

In step 407, upon receipt of the indicator, base station 105 may determine whether to perform a beam switch to another beam in an effort to help UE 115 manage its temperature problem. Base station 105 may use information previously provided from UE 115 to make the determination. Further, base station 105 may use information that was not provided from UE 115 in making the determination. In embodiments, base station 105 may balance the needs of base station 105, other base stations, UE 115, other UEs, and other components of the network when making a determination.

For example, base station 105 has prior knowledge regarding which RFIC is currently beamforming. Further, in step 402, UE 115 provided information regarding the UE determined top-N beams and may have provided information identifying which RFIC correspond to which top beam. Using this information, base station 105 may determine that a second RFIC (e.g. RFIC 301b) is associated with one of the top-N beams. Further, base station 105 may determine that RFIC 301a is the RFIC serving the current communications and is experiencing a thermal problem. Based on at least this information, base station 105 may determine that switching to a top beam that corresponds to RFIC 301b may resolve UE's 115 temperature problem. By switching away from RFIC 301a, the processing, transmission, receiving, and the like of hardware in the area reduces, which allows heat in the area to dissipate.

In step 407, base station 105 determines a beam switch and the timing of the switch. For example, base station 105 determines which beam the communications should switch to and which subframe to perform the beam switch. In embodiments, base station 105 may balance the needs of base stations 105, other base stations, UE 115, other UEs, and other components of the network when making the determination. Once base station 105 determines the beam switch, the information is communicated to UE 115.

In steps 408 and 409, when the appropriate subframe is reached, base station 105 switches to the alternative beam. Likewise, UE 115 switches to the alternative beam (e.g., newly assigned beam). For example, UE 115 may cause serving RFIC 301*a* to cease servicing the mmW communications and cause RFIC 301*b* to start servicing the mmW communications. With the beam switched, RFIC 301*a* and other hardware in its sector has an opportunity to cool down.

Figure 5:
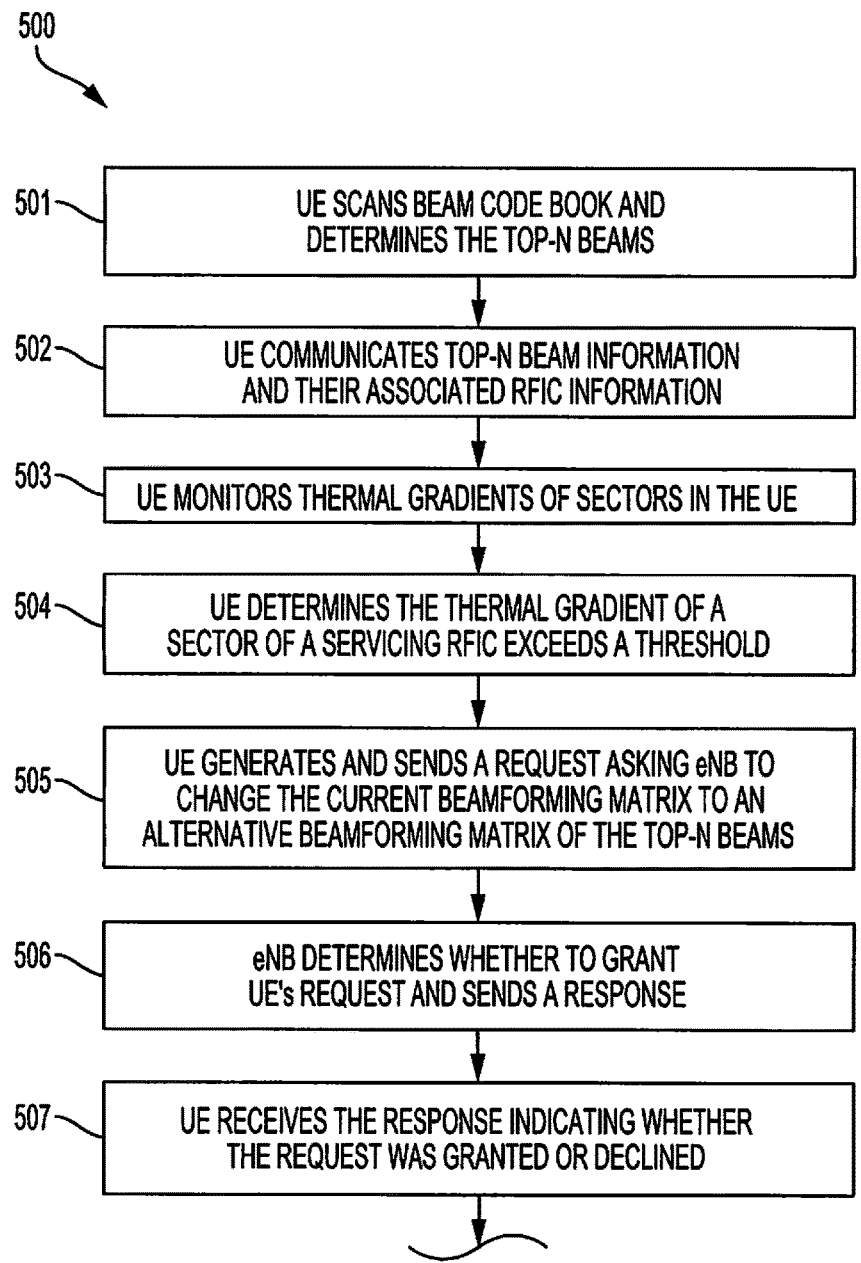
FIG. 5 is an example method of adjusting functionality of one or more hardware components of a device according to some embodiments.
Figure 5:
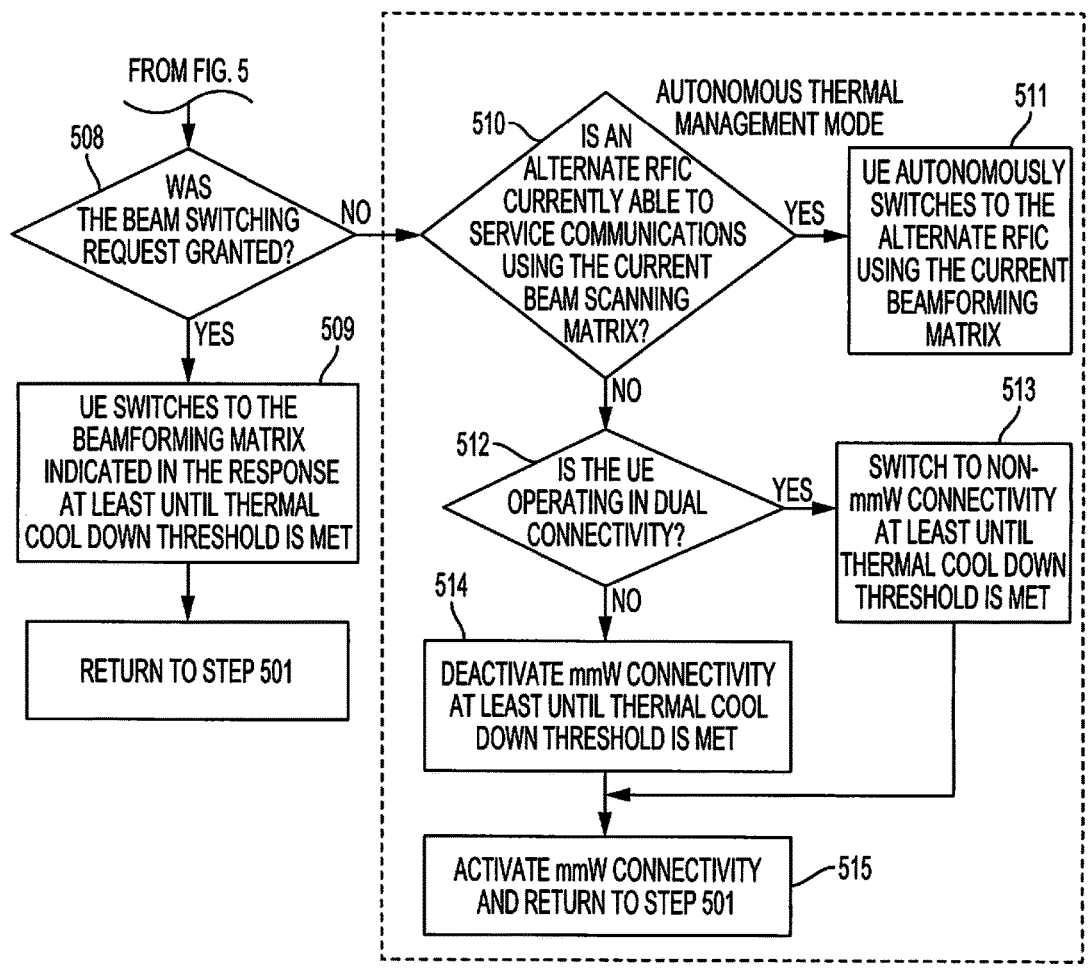

FIG. 5 is another example method of adjusting functionality of one or more hardware components of a device according to some embodiments. Example method 500 may be performed by UE 115 if desired. In step 501, controller/processor 280 scans beams within a codebook to determine the top-N beams at that time. In step 502, UE 115 may communicate top-N beam information to base station 105. The top-N beam information may include information with respect to each individual top beam. Top-N beam information may include a channel quality indicator (CQI), preceding matrix indicator (PMI), rank indicator (RI), and/or the like. Top-N beam information may also include an RFIC association to a top beam. For example, information may identify which RFIC corresponds to which top beam. Steps 501 and 502 may be repeated periodically and/or as desired. Further, step 502 may be omitted in embodiments.

In step 503, UE 115 monitors thermal gradients of one or more sector of UE 115. UE 115 may perform step 503 continually, periodically, in reaction to an event and/or condition, a combination thereof, and/or the like. In step 503, controller/processor 280 may receive temperature readings from one or more temperature sensor 304*a*-304*n*.

In step 504, controller/processor 280 may consider the temperature readings independently, jointly, and/or a combination thereof. Based on the temperature readings, processor/controller 280 may determine a thermal gradient for one or more sector of UE 115. For example, controller/processor 280 may determine a thermal gradient for one or more of RFICs 301*a*-301*n*. Controller/processor 280 may compare the various determined thermal gradients to a thermal threshold. Each sector may have the same or differing thermal thresholds. For example, the sector of RFID 301*a* may have a different thermal threshold than the sector of RFIC 301*b*. The thermal threshold may be based on the thermal capacity of the hardware within a defined sector. In step 504, controller/processor 280 determines that the thermal gradient of the sector of the serving RFIC exceeds the thermal threshold for that sector.

In embodiments, method 500 moves to step 505. In step 505, UE 115 generates a request asking base station 105 for a beam switch. UE 115 may indicate which beam the UE desires and the desired beam may be one of the beams identified as a top-N beam from step 501. In embodiments wherein UE 115 indicates which beam the UE desires, UE 115 may identify a beam that will be serviced by an RFIC that is not currently servicing a beam. By choosing a different RFIC to service communications, UE 115 affords the currently serving RFIC and antenna array an opportunity to reduce its processing, transmitting, receiving, and the like. The reduced activity allows the RFIC and other hardware in the sector to cool down. Having generated the request, in step 505 UE 115 send the request to base station 105.

In step 506, base station 105 determines whether to grant the request. In embodiments, base station 105 may balance the needs of base stations 105, other base stations, UE 115, other UEs, and other components of the network when making a determination. Upon base station 105 making the determination, base station 105 sends a message to UE 115 that may grant or deny the request. In some embodiments, base station 105 denies the request. In some embodiments, base station grants UE 115's request for the top beam identified in the request. In some embodiments, base station 105 determines which beam to switch to. For example, base station 105 may determine that another of UE's top-N beams (as indicated in step 502) may better suit the overall network. In such a case, base station may deny part of UE's beam switching request but grant the request with respect to a different beam. Base station's 105 response may indicate as such. In another example, UE's 115 beam switch request may not indicate the beam to which UE 115 desires to switch. In such a case, base station 105 may select which beam to switch to on its own. Further details regarding base station 105 selecting a beam are detailed above.

In step 507, UE 115 receives the response, which may indicate a grant or denial of the beam switch request. In step 508, UE 115 determines whether the beam switch request was granted. If the beam switch request was granted, then in step 509, UE 115 switches to the beam forming matrix indicated in the response. The indicated beam may be the beam requested by the UE and/or the beam selected by the base station. In this process, the servicing RFIC and its antenna subarray cease servicing the communications, and an alternative RFIC and its alternative antenna subarray begin servicing the communications using the alternative beam forming matrix. In some embodiments, the alternative beam forming matrix is used until a thermal cool down of the overheated sector is reached. Upon a thermal cool down of the sector being reached, the RFIC within the sector may be restored to servicing a beam again if desired. Such a decision may be based on the RFIC's ranking as compared to the other RFICs.

In step 508, if the beam switch request is denied, UE 115 may enter into autonomous thermal management mode. In step 510, UE 115 determines whether an alternate RFIC (e.g., an alternate antenna subarray) is able to service the communications during the current beam scanning period using the current beam scanning matrix supported by base station 105. If UE 115 determines that an alternative RFIC is able to service the communications using the current beam scanning matrix, in step 511, UE 115 switches servicing the communications away from the serving RFIC (e.g., the serving antenna subarray) to the alternative RFIC using the current beam scanning matrix (e.g., the beam scanning matrix currently supported by the base station). In this processes, the servicing RFIC and its antenna subarray ceases servicing the communications, which allows the previously serving RFIC and hardware of its sector to cool down.

If UE 115 determines that an alternative RFIC is not able to service communications during the current beam scanning period using the base station supported beam, in step 512, UE 115 determines whether it is able to support dual connectivity. If UE 115 is able to support dual connectivity, UE 115 switches away from NG connectivity (e.g., mmW communications) and falls back to LTE connectivity, 3G connectivity (e.g., microwave communications), and/or other non-mmW communications. LTE connectivity involves less processing and less precise beamforming. As such, the servicing RFIC and hardware of its sector are afforded an opportunity to cool down. UE 115 may remain in alternate connectivity until the sector reaches a cool down threshold. Upon the sector reaching a thermal cool down threshold, in step 515, UE 115 may switch back to mmW connectivity if desired.

If at step 512 UE 115 determines that dual connectivity cannot be supported, the method moves to step 514 wherein NG connectivity (e.g., mmW communications) is inactivated to prevent permanent hardware failure. In this step, the servicing RFIC and its antenna array cease servicing the communications. Upon inactivating mmW connectivity, the servicing RFIC and hardware reduce processing, transmitting, receiving, and the like; the heat dissipates; and the sector is able to cool down. Upon the sector reaching a thermal cool down threshold, in step 515, UE 115 may reactive mmW connectivity.

In embodiments, steps of example methods 400 and 500 may be skipped, rearranged, and or combined. For example, autonomous thermal management mode may be performed in method 400 in reaction to request denial, if desired. In another example, steps 512 and 513 may be skipped and/or omitted in light of temperatures breaching a second tier thermal threshold or if otherwise desired.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 2 and 3 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A wireless communication method that adjusts beamforming to prevent thermal overshoot of user equipment (UE) hardware, the method comprising:
deciding, by the UE, that a thermal gradient of a sector of the UE breaches a thermal threshold;
determining, by the UE, whether one or more alternate antenna subarrays are operable to support wireless communications during a beam scanning period; and
ceasing, by the UE based at least in part on the breach of the thermal threshold of the sector, a servicing antenna subarray from servicing of millimeter wave (mmW) communications at least until the thermal gradient of the sector meets a cool down threshold.

2. The method of claim 1 further comprising:
switching, by the UE, servicing of the mmW communications to one of the alternative antenna subarrays that is determined to be operable to support wireless communications during the beam scanning period.

3. The method of claim 2 further comprising:
selecting, by the UE, the one of the alternative antenna subarrays that is determined to be operable to support wireless communications during the beam scanning period; and
performing the switching based at least in part on the selecting.

4. The method of claim 3 wherein the selecting comprises:
receiving, by the UE from a base station, a response denying a request to change a beamforming matrix used with respect to the servicing antenna subarray; and
performing, by the UE based at least in part on the response, the selecting based at least in part on a determination that the alternative antenna subarray that supports wireless communications during the beam scanning period utilizing the beamforming matrix used with respect to the servicing antenna subarray.

5. The method of claim 2 further comprising:
receiving, by the UE from a base station, a response granting a request to perform the switching; and
performing the switching according to information indicated in the grant.

6. The method of claim 1 further comprising:
receiving, by the UE from a base station, a response denying a request to change a beamforming assignment; and
switching, by the UE based at least in part on the response, servicing of the mmW communications to servicing of non-mmW communications.

7. The method of claim 1 further comprising:
concluding that the thermal gradient of the sector meets a cool down threshold;
ranking the servicing antenna subarray higher than other antenna subarrays of the UE; and
restoring, based at least in part on the concluding and the ranking, the servicing antenna subarray servicing of mmW communications.

8. The method of claim 1 wherein the determining whether one or more alternate antenna subarrays are operable to support wireless communications during the beam scanning period comprises:
scanning beams from a beam codebook;
ranking each of the scanned beams based at least in part on one of a power metric, a quality metric, and strength metric; and
determining that the one or more alternative antenna subarrays are ranked as providing top-N beams as compared to other antenna subarray controllers of the UE.

9. A non-transitory computer-readable medium having program code recorded thereon, which causes user equipment (UE) to adjust beamforming to prevent thermal overshoot of the UE's hardware, the program code comprising:
code for deciding, by the UE, that a thermal gradient of a sector of the UE breaches a thermal threshold;
code for determining, by the UE, whether one or more alternate antenna subarrays are operable to support wireless communications during a beam scanning period; and
code for ceasing, by the UE based at least in part on the breach of the thermal threshold of the sector, a servicing antenna subarray from servicing of millimeter wave (mmW) communications at least until the thermal gradient of the sector meets a cool down threshold.

10. The UE of claim 9 further comprising:
code for switching, by the UE, servicing of the mmW communications to one of the alternative antenna subarrays that is determined to be operable to support wireless communications during the beam scanning period.

11. The UE of claim 10 further comprising:
code for selecting, by the UE, the one of the alternative antenna subarrays that is determined to be operable to support wireless communications during the beam scanning period; and
code for performing the switching based at least in part on the selecting.

12. The UE of claim 11 wherein the selecting comprises:
code for receiving, by the UE from a base station, a response denying a request to change a beamforming matrix used with respect to the servicing antenna subarray; and
code for performing, by the UE based at least in part on the response, the selecting based at least in part on a determination that the alternative antenna subarray that supports wireless communications during the beam scanning period utilizing the beamforming matrix used with respect to the servicing antenna subarray.

13. The UE of claim 10 further comprising:
code for receiving, by the UE from a base station, a response granting a request to perform the switching; and
code for performing the switching according to information indicated in the grant.

14. The UE of claim 9 further comprising:
code for receiving, by the UE from a base station, a response denying a request to change a beamforming assignment; and
code for switching, by the UE based at least in part on the response, servicing of the mmW communications to servicing of non-mmW communications.

15. The UE of claim 9 further comprising:
code for concluding that the thermal gradient of the sector meets a cool down threshold;
code for ranking the servicing antenna subarray higher than other antenna subarrays of the UE; and
code for restoring, based at least in part on the concluding and the ranking, the servicing antenna subarray servicing of millimeter wave (mmW) communications.

16. The UE of claim 9 wherein the determining whether one or more alternate antenna subarrays are operable to support wireless communications during the beam scanning period comprises:
  scanning beams from a beam codebook;
  code for ranking each of the scanned beams based at least in part on one of a power metric, a quality metric, and strength metric; and
  code for determining that the one or more alternative antenna subarrays are ranked as providing top-N beams as compared to other antenna subarray controllers of the UE.

17. A wireless communication system that adjusts beamforming to prevent thermal overshoot of user equipment (UE) hardware, the system comprising:
  means for deciding, by the UE, that a thermal gradient of a sector of the UE breaches a thermal threshold;
  means for determining, by the UE, whether one or more alternate antenna subarrays are operable to support wireless communications during a beam scanning period; and
  means for ceasing, by the UE based at least in part on the breach of the thermal threshold of the sector, a servicing antenna subarray from servicing of millimeter wave (mmW) communications at least until the thermal gradient of the sector meets a cool down threshold.

18. The system of claim 17 further comprising:
  means for switching, by the UE, servicing of the mmW communications to one of the alternative antenna subarrays that is determined to be operable to support wireless communications during the beam scanning period.

19. The system of claim 18 further comprising:
  means for selecting, by the UE, the one of the alternative antenna subarrays that is determined to be operable to support wireless communications during the beam scanning period; and
  means for performing the switching based at least in part on the selecting.

20. The system of claim 19 wherein the selecting comprises:
  means for receiving, by the UE from a base station, a response denying a request to change a beamforming matrix used with respect to the servicing antenna subarray; and
  means for performing, by the UE based at least in part on the response, the selecting based at least in part on a determination that the alternative antenna subarray that supports wireless communications during the beam scanning period utilizing the beamforming matrix used with respect to the servicing antenna subarray.

21. The system of claim 18 further comprising:
  means for receiving, by the UE from a base station, a response granting a request to perform the switching; and
  means for performing the switching according to information indicated in the grant.

22. The system of claim 17 further comprising:
  means for receiving, by the UE from a base station, a response denying a request to change a beamforming assignment; and
  means for switching, by the UE based at least in part on the response, servicing of the mmW communications to servicing of non-mmW communications.

23. A wireless communication system that adjusts beamforming to prevent thermal overshoot of user equipment (UE) hardware, the system comprising:
  multiple antenna subarrays of the UE including a servicing antenna subarray that is servicing millimeter wave (mmW) communications and at least one other antenna subarrays;
  one or more temperature sensors of the UE that detect that a thermal gradient of a sector of the UE breaches a thermal threshold; and
  a processor of the UE that determines whether one or more alternate antenna subarrays are operable to support wireless communications during a beam scanning period, wherein the processor further determines that the thermal gradient of the sector of the UE meets the thermal threshold and based at least in part on the thermal gradient meeting the thermal threshold, ceases the servicing antenna subarray from servicing the millimeter wave (mmW) communications at least until the thermal gradient of the sector meets a cool down threshold.

24. The system of claim 23 wherein the processor switches servicing of the mmW communications to one of the alternative antenna subarrays that is determined to be operable to support wireless communications during the beam scanning period.

25. The system of claim 24 wherein the processor selects the one of the alternative antenna subarrays that is determined to be operable to support wireless communications during the beam scanning period and performs the switch is based at least in part on the selecting.

26. The system of claim 25 further comprising:
  a receiver of the UE that receives from a base station a response denying a request to change a beamforming matrix used with respect to the servicing antenna subarray, wherein based at least in part on the response, the processor performs the selection based at least in part on a determination that the alternative antenna subarray that supports wireless communications during the beam scanning period utilizing the beamforming matrix used with respect to the servicing antenna subarray.

27. The system of claim 24 further comprising:
  a receiver of the UE that receives from a base station a response granting a request to perform the switch, wherein the processor performs the switch to information indicated in the grant.

28. The system of claim 23 further comprising:
  a receiver of the UE that receives from a base station a response denying a request to change a beamforming assignment wherein the processor, based at least in part on the response, switches the mmW communications to non-mmW communications.

29. The system of claim 23 wherein the processor concludes that the thermal gradient of the sector meets a cool down threshold, wherein the processor ranks the servicing antenna subarray higher than the other antenna subarrays of the UE, and wherein based at least in part on the conclusion and the rank, the processor restores the servicing antenna subarray servicing of millimeter wave (mmW) communications.

30. The system of claim 23 wherein the processor determines whether one or more alternate antenna subarrays are operable to support wireless communications during the beam scanning period based at least in part on:
  scans of beams from a beam codebook;
  ranks of each of the scanned beams based at least in part on one of a power metric, a quality metric, and strength metric; and determination that the one or more alternative antenna subarrays are ranked as providing top-N beams as compared to other antenna subarray controllers of the UE.

* * * * *